United States Patent
Yang et al.

(10) Patent No.: US 7,120,337 B1
(45) Date of Patent: Oct. 10, 2006

(54) FIBER OPTIC PIGTAIL DESIGN FOR REDUCING INSERTION LOSS AND INSERTION LOSS RIPPLE

(75) Inventors: Di Yang, Fremont, CA (US); Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 11/093,948

(22) Filed: Mar. 29, 2005

(51) Int. Cl.
*G02B 6/26* (2006.01)

(52) U.S. Cl. ........................................ 385/43
(58) Field of Classification Search ................... 385/43
See application file for complete search history.

(56) References Cited

U.S. PATENT DOCUMENTS

| | | | | |
|---|---|---|---|---|
| 4,738,511 A | * | 4/1988 | Fling | 385/30 |
| 5,216,728 A | * | 6/1993 | Charlton et al. | 385/27 |
| 5,268,979 A | * | 12/1993 | Weidman | 385/42 |
| 5,717,798 A | * | 2/1998 | Strasser et al. | 385/37 |
| 6,047,097 A | * | 4/2000 | Kikuchi et al. | 385/39 |
| 6,081,641 A | * | 6/2000 | Chen | 385/43 |
| 6,212,318 B1 | * | 4/2001 | Cryan | 385/37 |
| 6,415,087 B1 | * | 7/2002 | Yang et al. | 385/123 |
| 6,466,717 B1 | * | 10/2002 | Gonthier | 385/43 |
| 2003/0068149 A1 | * | 4/2003 | Dautartas et al. | 385/123 |
| 2004/0114858 A1 | * | 6/2004 | Komine | 385/31 |
| 2005/0135740 A1 | * | 6/2005 | Kopp et al. | 385/28 |

* cited by examiner

*Primary Examiner*—Ellen E. Kim
(74) *Attorney, Agent, or Firm*—Patterson & Sheridan, LLP

(57) ABSTRACT

One embodiment of an optical fiber for reducing insertion loss and insertion loss ripple includes a tapered region where the optical fiber has a diameter of approximately 125 microns at a first end and a diameter of approximately 50 microns at a second end. The cladding layer of the tapered region is tapered from the first end towards the second end. This section of the optical fiber may be tapered using an etch process or any other technically feasible process. The tapered configuration enables the distance between the optical axes of two optical fibers inserted into a ferrule to be reduced from approximately 125 microns to approximately 50 microns. Decreasing the distance between the optical axes causes a reduction in both insertion loss and insertion loss ripple.

16 Claims, 5 Drawing Sheets

FIBER OPTIC PIGTAIL DESIGN FOR REDUCING INSERTION LOSS AND INSERTION LOSS RIPPLE

BACKGROUND OF THE INVENTION

1. Field of the Invention

The present invention relates generally to optical devices and, more particularly, to a fiber optic pigtail design for reducing insertion loss and insertion loss ripple.

2. Description of the Related Art

Bulk fiber (i.e., fiber with a 125 micron cladding diameter) is the most widely used fiber in fiber optic data and communications systems. Although fairly well-established as an industry standard, one well-known drawback of bulk fiber is that traditional methods of coupling these fibers to optical components with ferrules result in relatively high insertion loss and insertion loss ripple. High losses are particularly problematic when optical devices, such as dispersion compensators, are designed using several cascaded optical components, each of which is coupled to one or more optical fibers with a ferrule. For example, some dispersion compensator designs may include upwards of ten or more cascaded optical components. If the insertion loss and insertion loss ripple associated with each individual optical component are too great, then the compounded losses across the dispersion compensator may ultimately render the device unusable.

As the foregoing illustrates, there is a need in the art for a fiber optic pigtail design that reduces insertion loss and insertion loss ripple when bulk fiber is coupled to an optical component with a ferrule.

SUMMARY OF THE INVENTION

An optical fiber configured for reduced insertion loss and insertion loss ripple includes a first section having a first diameter and a second section having a second diameter, where the first diameter is greater than the second diameter. The optical fiber also includes a third section having a first end with a first cross-sectional area and a second end with a second cross-sectional area, where the first cross-sectional area is greater than the second cross-sectional area. Further, the third section is tapered from the first end towards the second end.

One advantage of the disclosed optical fiber is that the tapered configuration enables the distance between the optical axes of two optical fibers inserted into a ferrule to be reduced from approximately 125 microns to approximately 50 microns. Decreasing the distance between the optical axes causes a reduction in both insertion loss and insertion loss ripple.

DETAILED DESCRIPTION OF THE INVENTION

Figure 1:
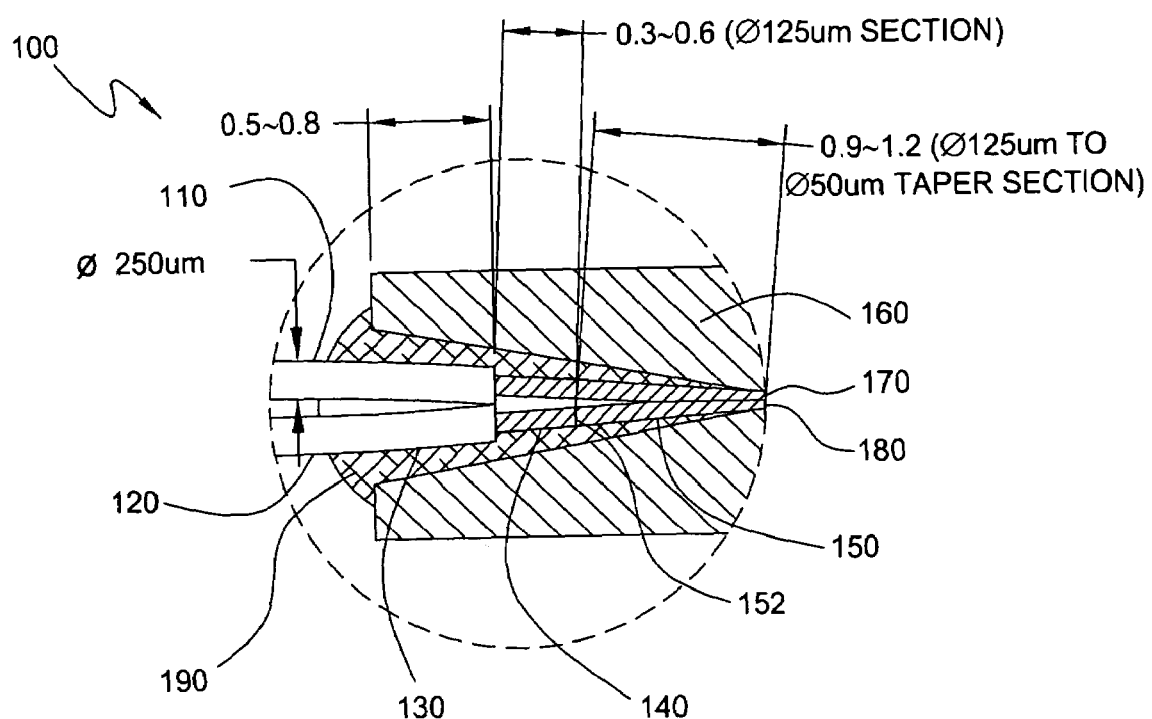
FIG. 1 illustrates a system for reducing insertion loss and insertion loss ripple, according to one embodiment of the present invention.

FIG. 1 illustrates a system 100 for reducing insertion losses, according to one embodiment of the present invention. As shown, system 100 includes, without limitation, a first optical fiber 110 and a second optical fiber 120 inserted into a ferrule 160 in order to couple first optical fiber 110 and second optical fiber 120 to an optical component (not shown). Epoxy 190 is used to secure first optical fiber 110 and second optical fiber 120 within ferrule 160 once first optical fiber 110 and second optical fiber 120 are properly positioned within ferrule 160 relative to the optical component. In a preferred embodiment, first optical fiber 110 and second optical fiber 120 have substantially similar configurations; therefore, for simplicity, only the configuration of second optical fiber 120 will be described.

Second optical fiber 120 has a first section 130, a second section 140 and a tapered section 150. First section 130 has a diameter of approximately 250 microns substantially throughout and extends approximately 0.5 to 0.8 millimeters into ferrule 160. First section 130 includes a core, a cladding layer and a coating. Second section 140 has a diameter of approximately 125 microns substantially throughout and extends approximately 0.3 to 0.6 millimeters further into ferrule 160 from the end of first section 130. The coating of second optical fiber 120 is stripped away from second section 140, leaving only the core and the cladding layer. Tapered section 150 has a first end 152 and a second end 180. Both first end 152 and second end 180 have circular cross-sections. The diameter of tapered section 150 at first end 152 is approximately 125 microns (i.e., substantially the same as the diameter of second section 140), and the diameter of tapered section 150 at second end 180 is approximately 50 microns. The cladding layer of tapered section 150 is tapered from first end 152 towards second end 180 over a length of approximately 0.9 to 1.2 millimeters. In one embodiment, tapered section 150 is tapered using an etch process. However, in other embodiments, tapered section 150 may be tapered in any other technically feasible fashion.

Figure 2:
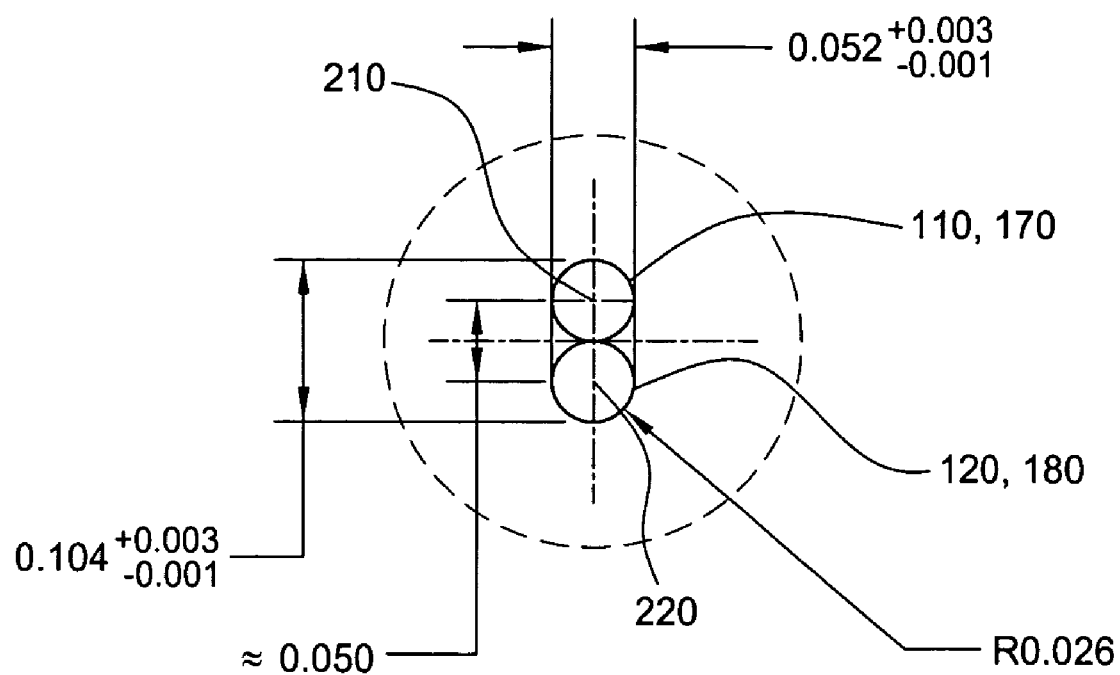
FIG. 2 illustrates an end view of the first optical fiber and the second optical fiber of FIG. 1, according to one embodiment of the present invention.

FIG. 2 illustrates an end view of first optical fiber 110 and second optical fiber 120 of FIG. 1, according to one embodiment of the present invention. As shown, a second end 170 of first optical fiber 110 abuts second end 180 of second optical fiber 120 such that the distance between an optical axis (or optical center) 210 of first optical fiber 110 and an optical axis (or optical center) 220 of second optical fiber 120 is approximately 50 microns. Although the preferred distance between optical axis 210 and optical axis 220 is approximately 50 microns, as is described in further detail herein, insertion loss and insertion loss ripple are reduced so long as the distance between optical axis 210 and optical axis 220 is between approximately 50 and approximately 125 microns.

One advantage of the system disclosed in FIGS. 1 and 2 is that the insertion loss and insertion loss ripple related to coupling first optical fiber 110 and second optical fiber 120 to an optical component with ferrule 160 are reduced. Research has shown that insertion loss and insertion loss ripple are functions of the distance between the optical axes of the optical fibers and the distance between the lens and mirrors of the optical component being coupled to the optical fibers with the ferrule. Decreasing the distance between the optical axes reduces the angular misalignment between the optical signal output by the optical component and the optical axis of the output optical fiber, thereby reducing insertion loss and insertion loss ripple. Decreasing the distance between the optical axes also reduces the sensitivity, in terms of insertion loss and insertion loss ripple, to the distance between the lens and mirrors of the optical component. As previously described, the distance between optical axis 210 and optical axis 220 in the system of FIGS. 1 and 2 is between approximately 50 microns and approximately 125 microns (where the preferred distance is 50 microns). By contrast, in prior art systems where the optical fibers are not tapered, the minimum distance between the optical axes of those optical fibers that can be achieved is 125 microns. Thus, the present invention enables up to a 60% decrease in the distance between optical axis 210 and optical axis 220 relative to prior art systems.

Experiments have shown that decreasing the distance between optical axes causes a corresponding reduction in insertion loss and insertion loss ripple. For example, in a system comprising two untapered 125 micron optical fibers, a 6 millimeter collimator lens and an optical component coupled to the two optical fibers with a ferrule, where a distance of 5 millimeters separates the collimator lens and the mirrors of the optical component, the insertion loss is 0.31 dB and the insertion loss ripple is 0.32 dB. By contrast, the insertion loss is 0.23 dB and the insertion loss ripple is 0.12 dB for the same system when the two untapered optical fibers are replaced with two optical fibers configured in accordance with the teachings of the present invention. As the foregoing illustrates, the present invention reduces the insertion loss by approximately 26% and the insertion loss ripple by approximately 62%.

As previously described, in a preferred embodiment, the configurations of first optical fiber 110 and second optical fiber 120 are substantially the same. However, in alternative embodiments, first optical fiber 110 and second optical fiber 120 may have different configurations, so long as the distance between optical axis 210 and optical axis 220 is between approximately 50 microns and approximately 125 microns.

Figure 3:
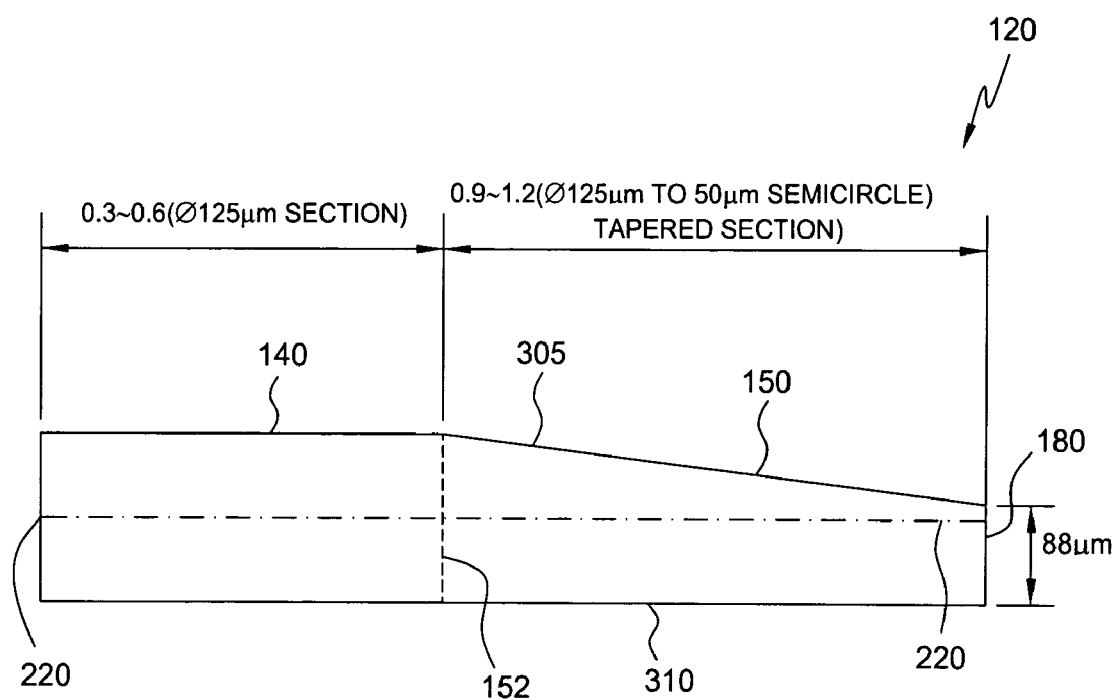
FIG. 3 illustrates the second optical fiber of FIG. 1, according to a second embodiment of the present invention.

FIG. 3 illustrates second optical fiber 120 of FIG. 1, according to a second embodiment of the present invention. As before, second section 140 has a diameter of approximately 125 microns substantially throughout, and first end 152 of tapered section 150 also has a circular cross-section with a diameter of approximately 125 microns. In this embodiment, however, one side 305 of the cladding layer of tapered section 150 is tapered from first end 152 towards second end 180 over a length of approximately 0.9 to 1.2 millimeters. Further, a second side 310 of the cladding layer of tapered section 150 is untapered such that, as more clearly shown in FIG. 4, the untapered part of second optical fiber 120 retains a semicircular shape having a diameter of approximately 125 microns. The configuration of the taper results in second end 180 of tapered section 150 having a D-shaped cross-section (as more clearly shown in FIG. 4) and a height of approximately 88 microns. In one embodiment, side 305 is tapered using a polishing process. However, in other embodiments, side 305 may be tapered in any other technically feasible fashion.

Figure 4:
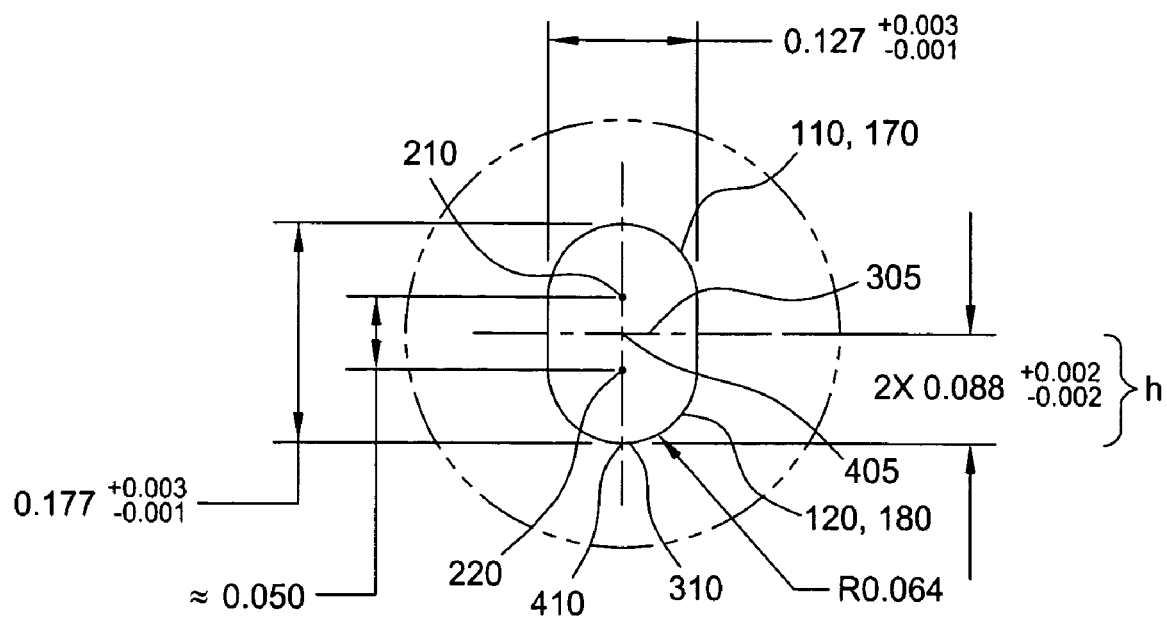
FIG. 4 illustrates an end view of the first optical fiber and the second optical fiber of FIG. 1, according to the second embodiment of the present invention.

FIG. 4 illustrates an end view of first optical fiber 110 and second optical fiber 120 of FIG. 1, according to the second embodiment of the present invention. As shown, tapered side 305 of second end 180 of second optical fiber 120 abuts the corresponding side of first end 170 of first optical fiber 110 such that the distance between optical axis 210 of first optical fiber 110 and optical axis 220 of second optical fiber 120 is approximately 50 microns. Again, as previously described herein, in alternative embodiments, the distance between optical axis 210 and optical axis 220 may be between approximately 50 microns and 125 microns. In addition, for purposes of this embodiment, the height (h) of second end 180 of second optical fiber 120 (and second end 170 of first optical fiber 110) is defined as the distance from a center 405 of an edge formed by tapered side 305 of tapered section 150 and the face of second end 180 to a point 410 on the edge formed by untapered side 310 of tapered section 150 and the face of second end 180 farthest from center 405. Again, in a preferred embodiment, this height is approximately 88 microns.

Figure 5:
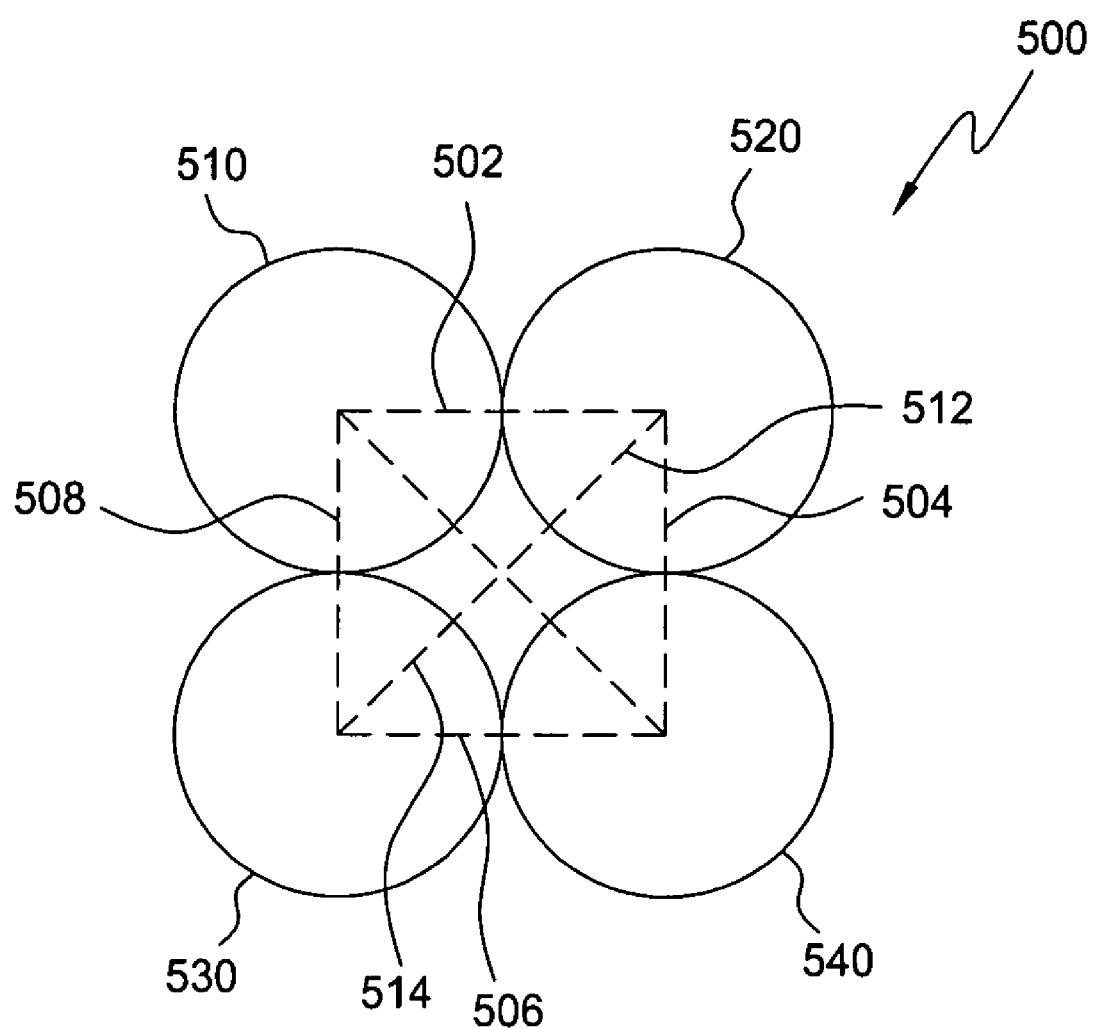
FIG. 5 illustrates an end view of a system for reducing insertion loss and insertion loss ripple, according to another embodiment of the present invention.

FIG. 5 illustrates an end view of a system 500 for reducing insertion loss and insertion loss ripple, according to another embodiment of the present invention. As shown, system 500 includes first optical fiber 510, a second optical fiber 520, a third optical fiber 530 and a fourth optical fiber 540 inserted into a ferrule (not shown). Distances 502, 504, 506 and 508 are substantially equal and represent the distances between the optical axes of adjacently positioned optical fibers in system 500—i.e., first optical fiber 510, second optical fiber 520, third optical fiber 530 and fourth optical fiber 540, as the case may be. The teachings of the present invention may be used to configure each of first optical fiber 510, second optical fiber 520, third optical fiber 530 and fourth optical fiber 540 such that each of distances 502, 504, 506 and 508 is less than approximately 88 microns. In such a configuration, a distance 512 between the optical axes of diagonally positioned second optical fiber 520 and third optical fiber 530 and a distance 514 between the optical axes of diagonally positioned first optical fiber 510 and fourth optical fiber 540 are less than approximately 125 microns. Thus, the distances between all optical axes are less than 125 microns, thereby resulting in reduced insertion loss and insertion loss ripple, as previously described herein.

In a preferred embodiment, each of distances 502, 504, 506 and 508 is approximately 50 microns and each of distances 512 and 514 is approximately 71 microns. In alternative embodiments, first optical fiber 510, second optical fiber 520, third optical fiber 530 and fourth optical fiber 540 may have substantially equivalent or different configurations, and distances 502, 504, 506 and 508 may be different from one another, so long as each of distances 502, 504, 506, 508, 512 and 514 is less than approximately 125 microns.

While the foregoing is directed to embodiments of the present invention, other and further embodiments of the invention may be devised without departing from the basic scope thereof, and the scope thereof is determined by the claims that follow.

The invention claimed is:

1. A system for reducing insertion loss and insertion ripple when coupling optical fiber to an optical component, the system comprising:
   a ferrule coupled to the optical component;
   an input optical fiber having a first optical axis and a first end inserted into the ferrule and configured for transmitting an optical signal to the optical component, the input optical fiber further having:
   a first section having a first diameter,
   a second section having a second diameter, wherein the first diameter is greater than the second diameter, and
   a third section having a first end with the first cross-sectional area and a second end with a second cross-sectional area, wherein the first cross-sectional area is greater than the second cross-sectional area, and the third section is tapered from the first end towards the second end; and an output optical fiber having a second optical axis and a first end inserted into the ferrule and configured for receiving the optical signal reflected from the optical component, the output optical fiber further having:
a first section having a first diameter,
a second section having a second diameter, wherein the first diameter is greater than the second diameter, and
a third section having a first end with the first cross-sectional area and a second end with a second cross-sectional area, wherein the first cross-sectional area is greater than the second cross-sectional area, and the third section is tapered from the first end towards the second end, wherein the second end of the third section of the output optical fiber has a D-shaped cross-section.

2. The system of claim 1, wherein a distance from the first optical axis at the second end of the third section of the input optical fiber and the second optical axis at the second end of the third section of the output optical fiber is between approximately 50 microns and approximately 125 microns.

3. The system of claim 2, wherein the distance between the first optical axis and the second optical axis is approximately 50 microns.

4. The system of claim 1, wherein the first end of the third section of the output optical fiber has a diameter of approximately 125 microns, and the second end of the third section of the output optical fiber has a circular cross-section with a diameter of approximately 50 microns.

5. The system of claim 4, wherein the third section of the output optical fiber is tapered using an etch process.

6. The system of claim 4, wherein the first diameter of the output optical fiber is approximately 250 microns, and the second diameter of the output optical fiber is approximately 125 microns.

7. The optical fiber of claim 1, wherein the third section of the output optical fiber is tapered on one side using a polishing process.

8. The system of claim 7, wherein the first diameter of the output optical fiber is approximately 250 microns, and the second diameter of the output optical fiber is approximately 125 microns.

9. The system of claim 1, wherein the first end of the third section of the output optical fiber has a diameter of approximately 125 microns, and the second end of the third section of the output optical fiber has a height of approximately 87–89 microns.

10. The system of claim 1, wherein the first end of the third section of the input optical fiber has a diameter of approximately 125 microns, and the second end of the third section of the input optical fiber has a circular cross-section with a diameter of approximately 50 microns.

11. The system of claim 10, wherein the third section of the input optical fiber is tapered using an etch process.

12. The system of claim 10, wherein the first diameter of the input optical fiber is approximately 250 microns, and the second diameter of the input optical fiber is approximately 125 microns.

13. The system of claim 1, wherein the second end of the third section of the input optical fiber has a D-shaped cross-section.

14. The optical fiber of claim 13, wherein the third section of the input optical fiber is tapered on one side using a polishing process.

15. The system of claim 14, wherein the first diameter of the input optical fiber is approximately 250 microns, and the second diameter of the input optical fiber is approximately 125 microns.

16. The system of claim 13, wherein the first end of the third section of the input optical fiber has a diameter of approximately 125 microns, and the second end of the third section of the input optical fiber has a height of approximately 87–89 microns.

* * * * *